United States Patent
Nakagawa (10) Patent No.: US 8,036,621 B2
(45) Date of Patent: Oct. 11, 2011

(54) RECEIVING APPARATUS, SIGNAL PROCESSING CIRCUIT, AND SIGNAL RECEIVING METHOD

(75) Inventor: Kiyotaka Nakagawa, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 847 days.

(21) Appl. No.: 11/396,692

(22) Filed: Apr. 4, 2006

(65) Prior Publication Data

US 2006/0223477 A1    Oct. 5, 2006

(30) Foreign Application Priority Data

Apr. 5, 2005  (JP) .................................. 2005-108405

(51) Int. Cl.
*H04B 1/06* (2006.01)
(52) U.S. Cl. ............... 455/277.2; 455/278.1; 455/279.1; 455/135; 375/347; 348/725
(58) Field of Classification Search .......... 455/132–136, 455/272–279.1; 375/347; 348/705, 706, 348/725
See application file for complete search history.

(56) References Cited

U.S. PATENT DOCUMENTS

| | | | | |
|---|---|---|---|---|
| 4,255,816 A * | 3/1981 | Grunza et al. | ............. | 455/277.1 |
| 4,370,522 A * | 1/1983 | Takeda et al. | ..................... | 381/3 |
| 4,633,519 A * | 12/1986 | Gotoh et al. | ............... | 455/277.2 |
| 4,876,743 A * | 10/1989 | Lindenmeier et al. | ........ | 455/133 |
| 4,977,615 A * | 12/1990 | Suzuki et al. | ............... | 455/277.2 |
| 5,239,541 A * | 8/1993 | Murai | ........................... | 370/345 |
| 5,339,452 A * | 8/1994 | Sugawara | ..................... | 455/212 |
| 5,548,836 A * | 8/1996 | Taromaru | ................... | 455/277.1 |
| 5,603,107 A * | 2/1997 | Gottfried et al. | .............. | 455/133 |
| 5,918,164 A * | 6/1999 | Takahashi et al. | ............. | 455/134 |
| 6,064,865 A * | 5/2000 | Kuo et al. | ........................ | 455/135 |
| 6,725,027 B1 * | 4/2004 | Tsuji et al. | ..................... | 455/296 |
| 6,907,094 B2 * | 6/2005 | Matsui et al. | .................. | 375/347 |
| 6,947,716 B2 * | 9/2005 | Ono | .............................. | 455/273 |
| 6,985,544 B2 * | 1/2006 | Matsui et al. | .................. | 375/347 |
| 7,636,593 B2 * | 12/2009 | Kurioka | ..................... | 455/575.7 |
| 2003/0032403 A1* | 2/2003 | Ono | .............................. | 455/273 |
| 2003/0043942 A1* | 3/2003 | Ono | .............................. | 375/347 |
| 2005/0129155 A1* | 6/2005 | Hoshino | ...................... | 375/347 |

FOREIGN PATENT DOCUMENTS

| | | |
|---|---|---|
| JP | 07-030472 | 1/1995 |
| JP | 11-234172 | 8/1999 |
| JP | 2003-060539 | 2/2003 |
| JP | 2003-283395 | 10/2003 |
| JP | 2004-032518 | 1/2004 |

* cited by examiner

*Primary Examiner* — Junpeng Chen
(74) *Attorney, Agent, or Firm* — Harness, Dickey & Pierce, P.L.C.

(57) ABSTRACT

There is provided a receiving apparatus having a simple configuration and an excellent ability to eliminate multipath noise, in which an antenna in a good reception state can be instantly selected. A reception signal from an antenna is inputted to an intermediate-frequency amplifying circuit via an antenna switching circuit, a front end and an A/D converting circuit, and an S meter signal from an S meter circuit is inputted to a controlling section via a noise detecting filter and an absolute value circuit. Then, the controlling section compares noise components outputted from the absolute value circuit (noise level) with a threshold value Vth outputted from a threshold value setting section. When the noise level becomes higher than the threshold value Vth, an antenna selection controlling signal is outputted to the antenna switching circuit, and antennas are switched.

9 Claims, 11 Drawing Sheets

RECEIVING APPARATUS, SIGNAL PROCESSING CIRCUIT, AND SIGNAL RECEIVING METHOD

BACKGROUND OF THE INVENTION

1. Field of the Invention

The present invention relates to a receiving apparatus in which a plurality of antennas are provided and an antenna in an optimum reception state is selected, and also relates to a signal processing circuit used in the receiving apparatus, and a signal receiving method.

2. Description of the Related Art

Conventionally, in a TV tuner and radio tuner for vehicle, a diversity receiver provided with a plurality of antennas is used for the purpose of receiving the best radio waves at all times because the state of received radio waves changes continually as the vehicle moves, and the antennas are switched in a case where a level of multipath noise included in a reception signal exceeds a threshold value.

In order to select an antenna in a good radio wave condition without executing a complicated switch-over when switching antennas in such a diversity receiver, a sensitivity varying system is adopted.

Figure 10A:
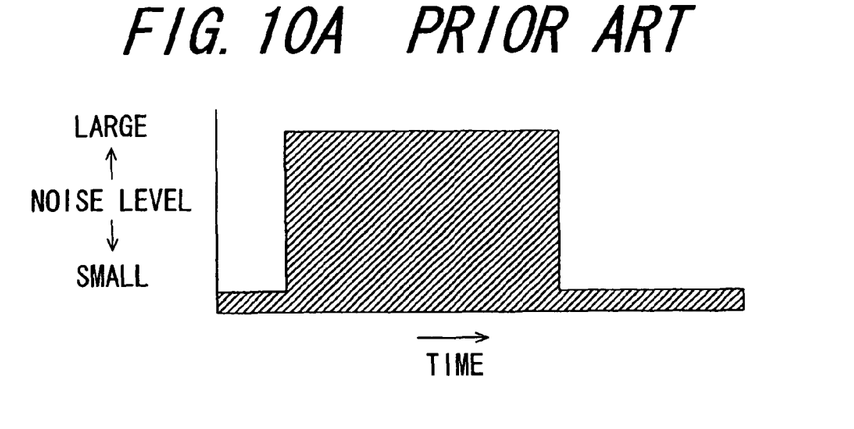
FIG. 10A illustrates a noise occurrence condition of an antenna A, and FIG. 10B illustrate a noise occurrence condition of an antenna B.
Figure 10B:
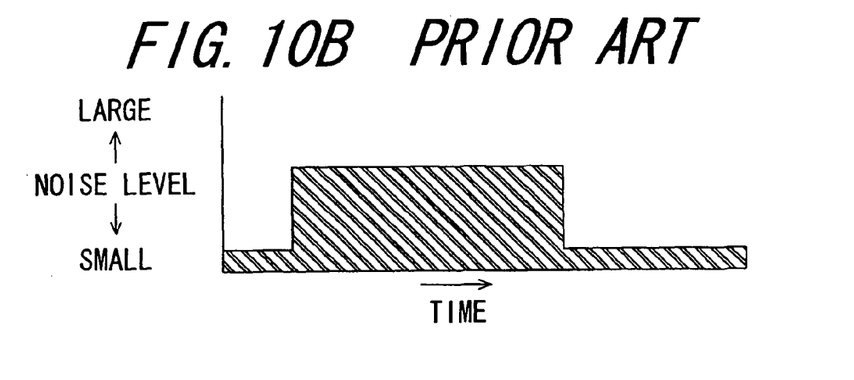
Figure 10C:
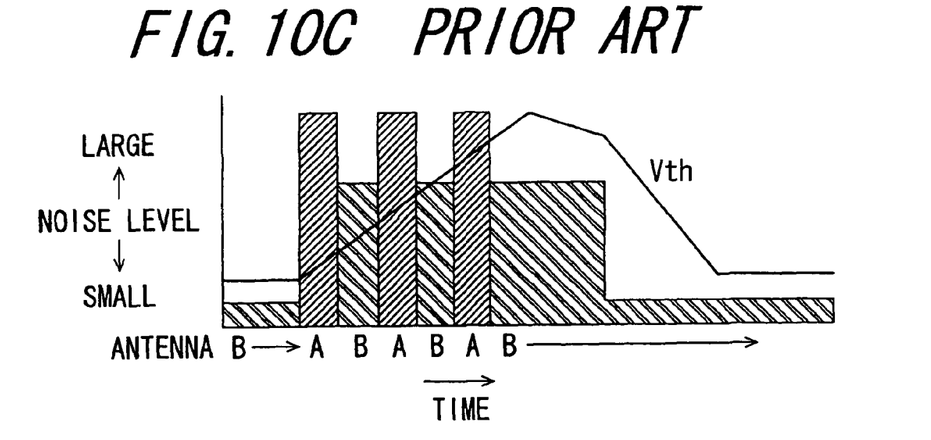
FIG. 10C illustrates a noise occurrence condition and antenna switching sensitivity.

To be more specific, in a case where antennas A and B are in such a noise occurrence condition that the multipath noise level is high as illustrated in FIGS. 10A and 10B, switch-over between the antennas A and B is performed every time the noise level exceeds antenna switching sensitivity (a threshold value) Vth as illustrated in FIG. 10C, and every time the switching is performed, the antenna switching sensitivity is decreased (the threshold value is increased) gradually depending on the noise level and so on (for example, refer to Japanese Unexamined Patent Publication JP-A 2003-60539).

That is to say, since such a condition that the antennas are switched continually is brought when the level of the threshold value Vth is too low with respect to a noise component, that is, the noise detection sensitivity of a comparator is too high, the noise detection sensitivity of the comparator is decreased to proper sensitivity by increasing the threshold value Vth, whereby an antenna switching controlling section is prevented from frequently performing antenna switch-over.

Figure 11:
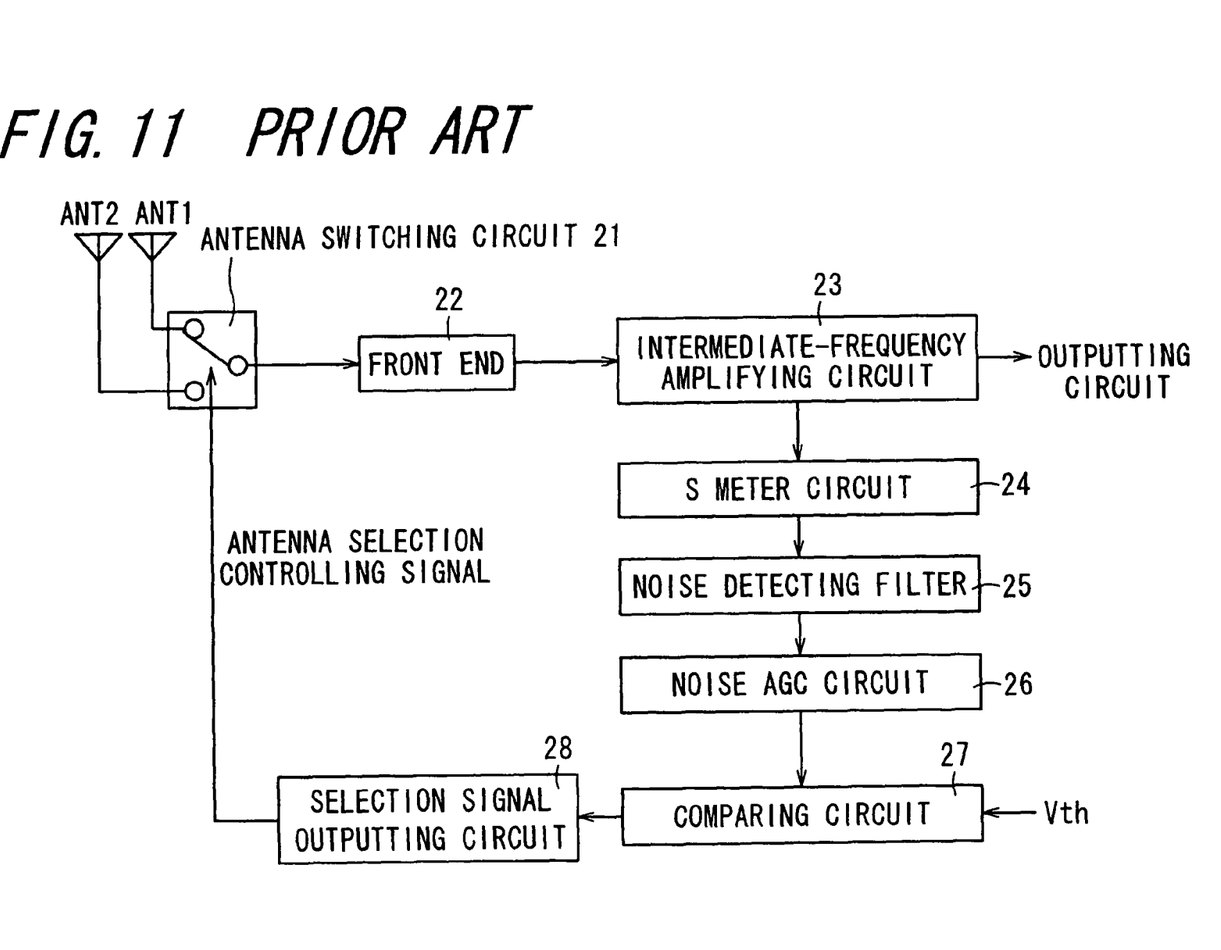
FIG. 11 is a view illustrating the configuration of the conventional diversity receiver.

FIG. 11 is a view illustrating the configuration of a conventional diversity receiver. In this diversity receiver, an antenna switching circuit 21 performs switch-over to select one of high-frequency reception signals generated when antennas ANT1 and ANT2 receive coming radio waves, and a high-frequency reception signal from one of the antennas selected by switch-over is inputted to an intermediate-frequency amplifying circuit 23 via a front end 22.

And then, an intermediate-frequency signal outputted from the intermediate-frequency amplifying circuit 23 is supplied to an outputting circuit (not illustrated) provided with an audio amplifier and so on, as well as supplied to an S meter circuit 24 that detects electric field intensity, and an electric field intensity signal from the S meter circuit 24 is inputted to a noise detecting filter 25, where a noise component is detected.

This noise component is inputted to a comparing circuit 27 via a noise AGC circuit 26 and compared with the threshold value Vth. When the output of the noise AGC circuit 26 gets larger than the threshold value Vth, the comparing circuit 27 outputs a signal to a selection signal outputting circuit 28, and the selection signal outputting circuit 28 causes the antenna switching circuit 21 to switch the antennas. When the frequency of detection of noise gets high, the noise AGC circuit 26 decreases gain to decrease the noise detection sensitivity of the comparing circuit 27 to proper sensitivity, thereby controlling so that antenna switch-over is not frequently performed.

As described above, in the conventional diversity receiver, a noise component included in airwaves received by a selected antenna is detected, and it is determined whether a reception state is good or bad based on the result of detection of noise, with the result that the antennas may be switched. In the case of switching all the antennas because the reception state is bad, the noise detection sensitivity is decreased to more proper sensitivity in order to prevent excessive antenna switch-over.

However, in such a system that the sensitivity is gradually decreased, the antenna switching sensitivity is varied by, for example, time constant of the AGC circuit, so that needless antenna switch-over is performed, and an antenna in a good reception state cannot be selected instantly.

SUMMARY OF THE INVENTION

The invention has been devised in view of the above problem, and an object thereof is to provide a receiving apparatus having a simple configuration and an excellent ability to eliminate multipath noise, in which an antenna in a good reception state can be instantly selected.

The invention provides a receiving apparatus comprising:

switching means for performing switch-over between a plurality of antennas;

noise detecting means for detecting noise included in a signal received from the antennas; and controlling means for controlling the switching means on a basis of comparison between a noise level of the detected noise and a threshold value, wherein the controlling means performs a threshold value setting process for setting the threshold value to a value based on the noise level, and control of the switching means is made to stop for a predetermined length of time after the threshold value setting process.

Further, in the invention, it is preferable that the threshold value is reset when a predetermined time has elapsed after the threshold value setting process.

Furthermore, in the invention, it is preferable that the threshold value is set to a larger value than the noise level of the detected noise.

Furthermore, in the invention, it is preferable that the receiving apparatus further comprises noise canceller means for eliminating, on a basis of a trigger signal, noise generated when controlling the switching means, and the controlling means outputs the trigger signal when controlling the switching means.

Furthermore, the invention provides a signal processing circuit comprising:

noise detecting means for detecting noise included in a signal; and controlling means for outputting a control signal on a basis of comparison between a noise level of the detected noise and a threshold value, wherein the controlling means executes a threshold value setting process for setting the threshold value to a value based on the noise level, and outputting the control signal by the controlling means stops for a predetermined length of time after the threshold value setting process.

Furthermore, the invention provides a signal receiving method comprising:

a noise detecting step of detecting noise included in a signal; and a controlling step of outputting a control signal on a basis of comparison between a noise level of the detected noise and a threshold value, wherein at the controlling step is executed a threshold value setting process for setting the threshold value to a value based on the noise level, and after the threshold value setting process, outputting the control signal stops for a predetermined length of time.

According to the invention, when antenna switch-over has been performed, a threshold value is set to a multipath noise level held before the antenna switch-over, so that it is possible to prevent frequent antenna switch-over as well as instantly select an antenna in a good reception state.

Further, according to the invention, when antenna switch-over has been performed, a threshold value is set to a corrected value of the noise level held before the antenna switch-over, so that it is possible to further decrease the frequency of antenna switch-over by, for example, correcting to a larger value than the noise level.

Furthermore, according to the invention, after an antenna switch-over control has been executed, antenna switch-over is not performed for a fixed time, so that it is possible to prevent needless antenna switch-over in a case where large multipath noise exists at all the antennas at the same time.

Furthermore, according to the invention, when a specified time has elapsed after antenna switch-over in which a threshold value has been first changed from an initial threshold value, or when a specified time has elapsed after antenna switch-over in which the threshold value has been last updated, the threshold value is reset to the initial threshold value, so that it is possible to prevent a situation where the noise level set as the threshold value is so large that the antennas are not switched.

Furthermore, according to the invention, a noise canceling trigger signal is outputted to the noise canceller means when the antennas are switched, so that it becomes possible to securely eliminate noise accompanying antenna switch-over.

Furthermore, according to the invention, when a switching signal has been outputted, a threshold value is set to the noise level held before output of the switching signal, so that it is possible to realize a receiving apparatus such as a diversity receiver in which frequent antenna switch-over can be prevented as well as an antenna in a good reception state can be instantly selected, by using the signal processing circuit in the receiving apparatus.

BRIEF DESCRIPTION OF THE DRAWINGS

Other and further objects, features, and advantages of the invention will be more explicit from the following detailed description taken with reference to the drawings wherein:

FIGS. 10A to 10C are views illustrating the state of change of a threshold value at the time of antenna switch-over in the diversity receiver adopting the conventional sensitivity varying system, where

DETAILED DESCRIPTION OF THE PREFERRED EMBODIMENT

Now referring to the drawings, preferred embodiments of the invention are described below.

Embodiment 1

A receiving apparatus according to an embodiment of the invention will be described below. Since digital receivers have taken the place of analog receivers recently, an embodiment applied to a digital diversity receiver will be described.

Figure 1:
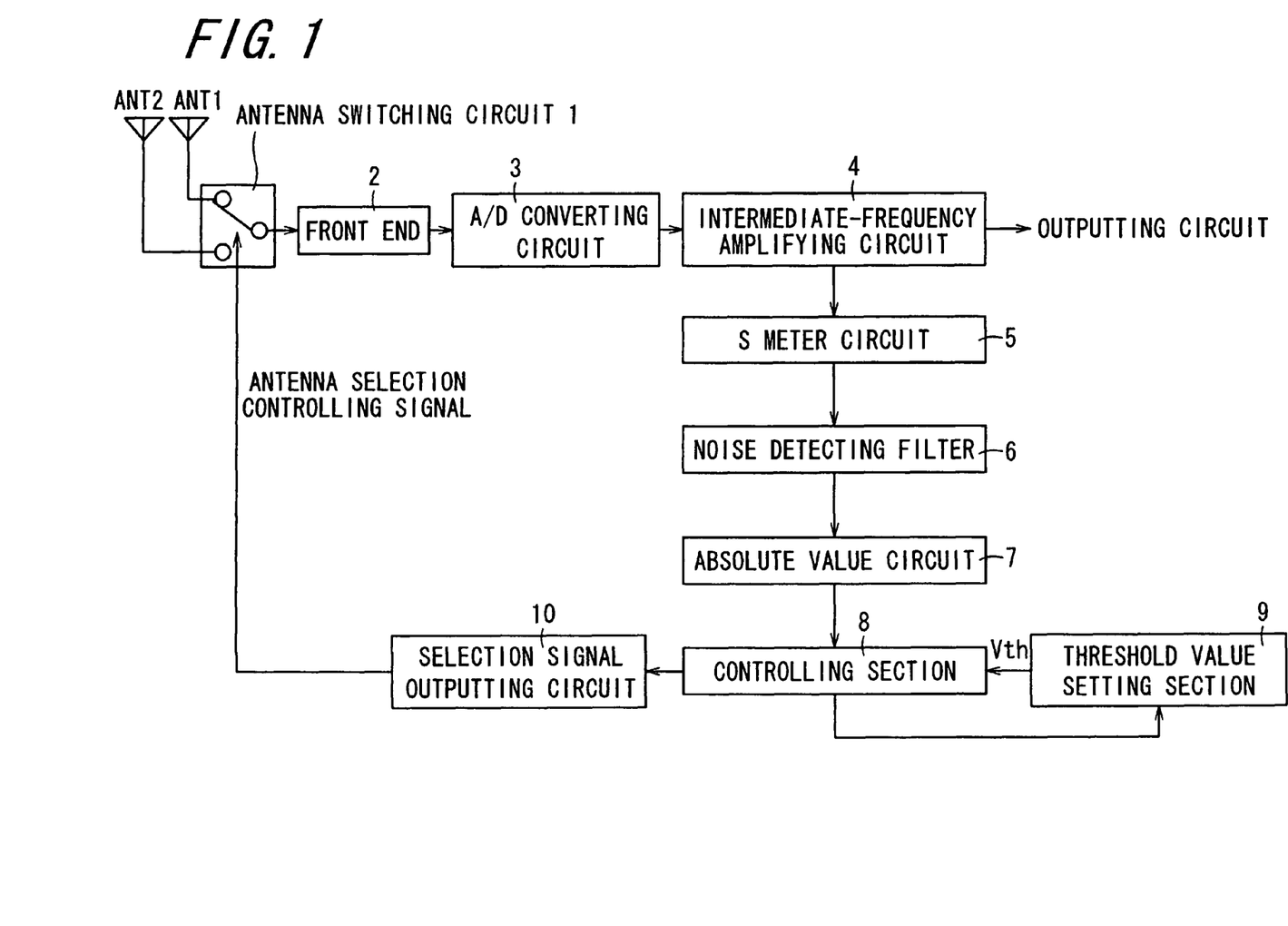
FIG. 1 is a block diagram illustrating the configuration of a diversity receiver which is a receiving apparatus according to one embodiment of the invention.

FIG. 1 is a block diagram illustrating the configuration of the diversity receiver which is a receiving apparatus according to one embodiment of the invention. As illustrated in FIG. 1, the diversity receiver comprises an antenna switching circuit 1, a front end 2, an A/D converting circuit 3, an intermediate-frequency amplifying circuit 4, an S meter circuit 5, a noise detecting filter 6, an absolute value circuit 7, a controlling section 8, a threshold value setting section 9 and a selection signal outputting circuit 10.

The antenna switching circuit 1 is composed of a selector switch that performs switch-over between a plurality (in the embodiment, two) of antennas ANT1 and ANT2. The front end 2 selects a signal of a desired station among signals received from a given antennas via the antenna switching circuit 1, and converts the signal to an intermediate-frequency signal. The A/D converting circuit 3 converts an analog intermediate-frequency signal outputted from the front end 2 to a digital signal, and inputs the digital signal to the intermediate-frequency amplifying circuit 4. The intermediate-frequency amplifying circuit 4 digitally amplifies the intermediate-frequency signal, and supplies the intermediate-frequency signal to an outputting circuit (not illustrated) provided with an audio amplifier and so on, as well as supplies the intermediate-frequency signal to the S meter circuit 5.

The S meter circuit 5 inputs an S meter signal representing a received electric field level, to the noise detecting filter 6. The noise detecting filter 6 is a digital filter, and detects a multipath noise component and then inputs the multipath noise to the absolute value circuit 7. The absolute value of the noise component is inputted from the absolute value circuit 7 to the controlling section 8.

The controlling section 8 compares an average value or peak value of multipath noise components outputted from the absolute value circuit 7 with a threshold value Vth outputted from the threshold value setting section 9, thereby determining whether antenna switch-over should be performed or not. The controlling section 8 is configured by a CPU, a ROM, a RAM and so on, and executes its function by software.

Although an initial threshold value is previously set in the threshold value setting section 9, this threshold value can be changed according to an instruction outputted from the controlling section 8. The selection signal outputting circuit 10 switches the selector switch of the antenna switching circuit 1 according to an antenna switching instruction outputted from the controlling section 8, whereby the antennas are switched.

Next, the operation of the controlling section 8 when switching the antennas depending on the condition of radio waves will be described referring to a flowchart of FIG. 2.

Figure 2:
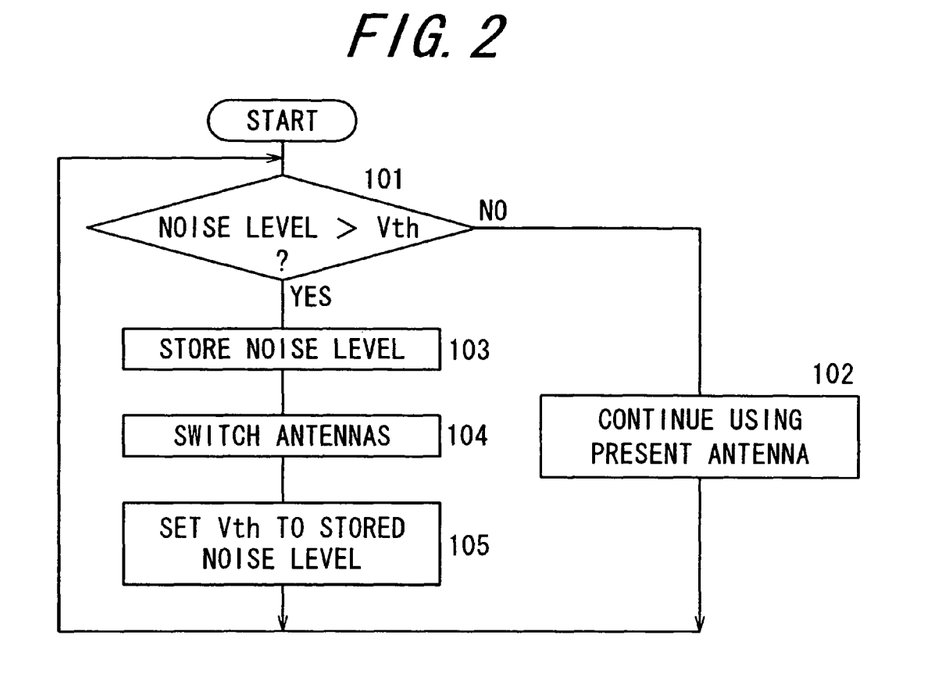
FIG. 2 is a flowchart illustrating the operation of a controlling section of the diversity receiver illustrated in FIG. 1.

The controlling section 8 is continuously executing an antenna switching program illustrated in the flowchart of FIG. 2. When starting this program, the controlling section 8 firstly at step 101 compares the average value or peak value (i.e., noise level) of multipath noise components outputted from the absolute value circuit 7 with the threshold value Vth, which is the initial threshold value at the beginning of the program, outputted from the threshold value setting section 9, thereby determining whether the noise level is higher than the threshold value Vth or not. In a case where the controlling section determines at step 101 that the noise level is the threshold value Vth or lower, the presently selected antenna continues to be used at step 102, and the program returns to step 101, where the controlling section 8 determines again whether the noise level is higher than the threshold value Vth or not.

On the other hand, in the case of determining at step 101 that the noise level is higher than the threshold value Vth, the controlling section 8 stores the noise level into a memory (not illustrated) at step 103 and then, outputs an antenna switching instruction to the selection signal outputting circuit 10 to switch the antennas at step 104. Consequently, an antenna selection controlling signal is outputted from the selection signal outputting circuit 10 to the antenna switching circuit 1, whereby the antennas are switched.

Next, at step 105, the controlling section 8 inputs the noise level stored in the memory to the threshold value setting section 9. After that, the program returns to step 101. The threshold value Vth set in the threshold value setting section 9 is set to the stored noise level, so that the detected noise level is afterward compared with the noise level held before antenna switch-over.

As described above, when the antennas have been switched, the threshold value is set to the antennas' multipath noise level held before antenna switch-over, with the result that it becomes possible to prevent frequent antenna switch-over as well as instantly select an antenna in a good reception state.

Embodiment 2

In the above embodiment, when the antennas have been switched, the threshold value is set to the antennas' noise level held be fore antenna switch-over. However, in a case where multipath noise of high level is steadily caused even if the antennas are switched, the frequency of antenna switch-over increases and therefore, the threshold value may be also set to a corrected value of the multipath noise level held before antenna switch-over when the antennas have been switched, in order to prevent the frequency of antenna switch-over from increasing. The operation of the controlling section 8 in the case of setting the threshold value to a corrected value of the multipath noise level held before antenna switch-over will be described below referring to a flowchart of FIG. 3.

Since a diversity receiver having the same configuration as that illustrated in FIG. 1 is used, the description thereof will be omitted.

Figure 3:
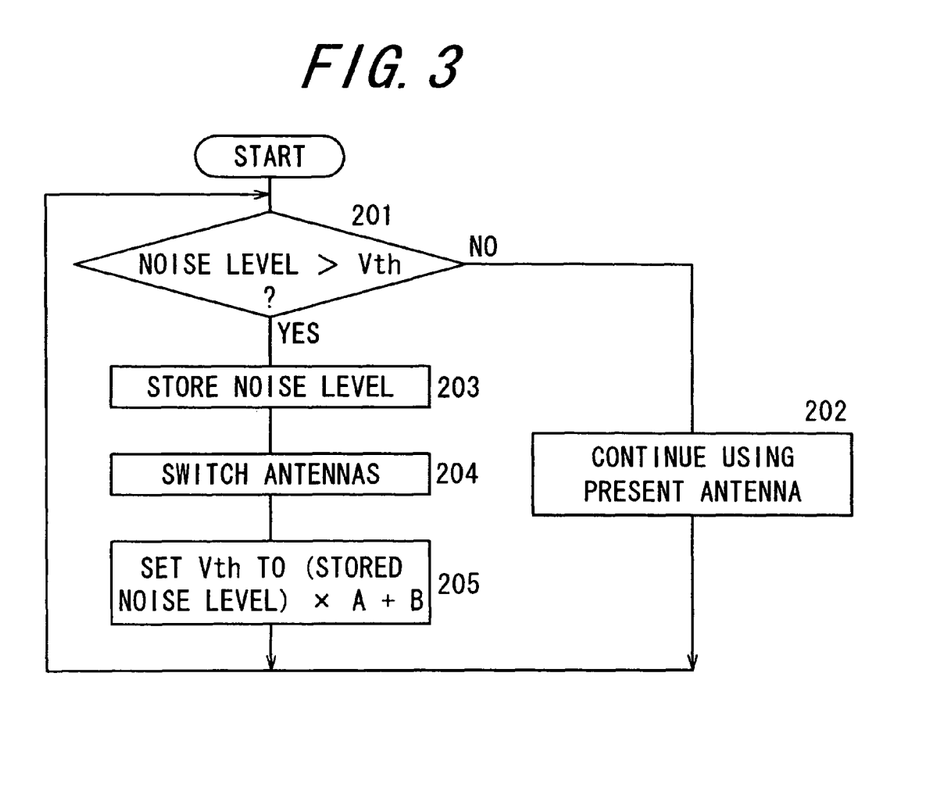
FIG. 3 is a flowchart illustrating the operation in the case of setting a threshold value to a corrected value of a multipath noise level held before antenna switch-over.

The controlling section 8 is continuously executing an antenna switching program illustrated in the flowchart of FIG. 3. When starting this program, at step 201, in a like manner as at the above-described step 101, the controlling section 8 compares the multipath noise components (the noise level) outputted from the absolute value circuit 7 with the threshold value Vth outputted from the threshold value setting section 9, thereby determining whether the noise level is higher than the threshold value Vth or not. At step 201, in a case where the controlling section 8 determines that the noise level is the threshold value Vth or lower, the presently selected antenna continues to be used at step 202, and the program returns to step 201, where the controlling section 8 determines again whether the noise level is higher than the threshold value Vth or not.

On the other hand, in the case of determining at step 201 that the noise level is higher than the threshold value Vth, the controlling section 8 stores the MP amount into a memory at step 203, and then outputs an antenna switching instruction to the selection signal outputting circuit 10, thereby switching the antennas at step 204. Next, at step 205, the controlling section 8 does the calculation of (noise level×A+B) (A and B are constants) using the noise level stored in the memory, and inputs the calculated value to the threshold setting section 9, thereby setting the calculated value as the threshold value Vth. Subsequently, the program returns to step 201.

As described above, by setting the threshold value to a corrected value of the noise level held before antenna switch-over, for example, to a larger value than the noise level held before antenna switch-over when the antennas have been switched, it is possible to further decrease the frequency of antenna switch-over.

Embodiment 3

Further, since needless antenna switch-over is performed in a case where large multipath noise exists at both of the two antennas at the same time, it is preferred in a case where antenna switching control has been executed that antenna switch-over be not allowed for a fixed time. The operation of the controlling section 8 in a case where antenna switch-over is not allowed for a fixed time when antenna switching control has been executed will be described below referring to a flowchart of FIG. 4.

In a like manner as described above, since a diversity receiver having the same configuration as that illustrated in FIG. 1 is used, the description thereof will be omitted.

Figure 4:
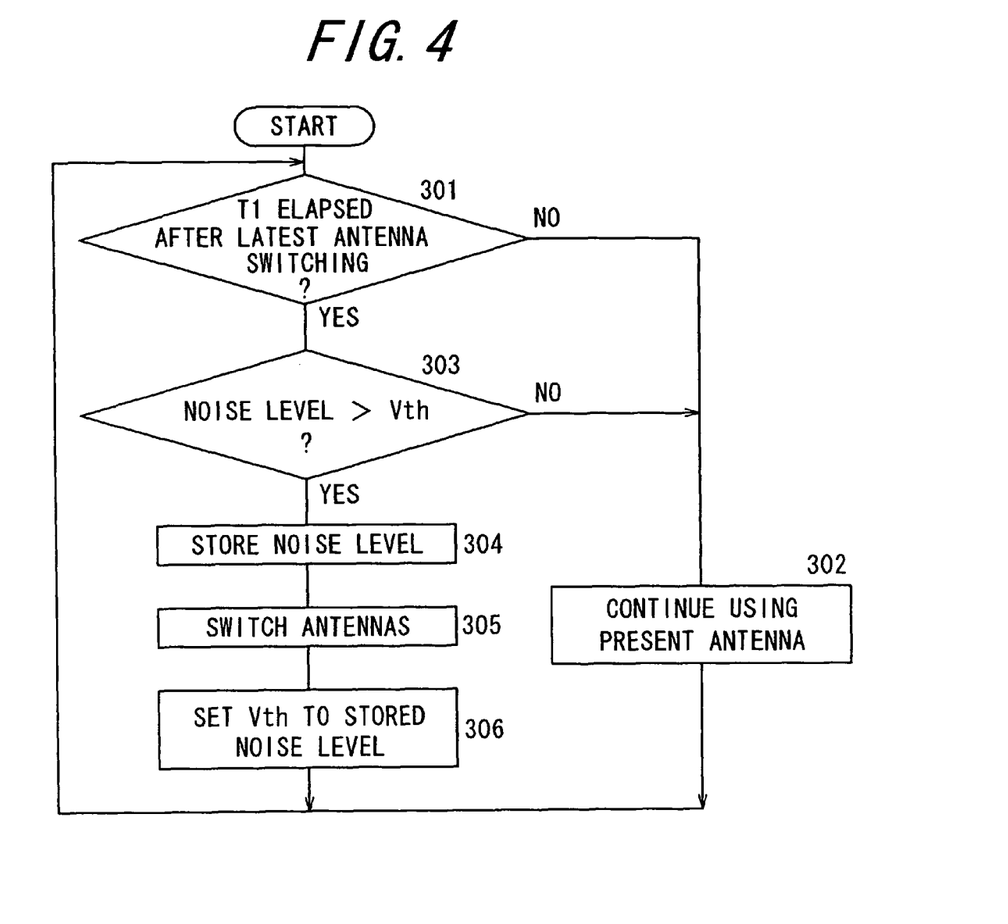
FIG. 4 is a flowchart illustrating the operation in the case of executing an antenna switching control and thereafter not allowing antenna switch-over for a fixed time.

The controlling section 8 is continuously executing an antenna switching program illustrated in the flowchart of FIG. 4. When starting this program, the controlling section firstly at step 301 determines whether T1 second, for example, 1 ms has elapsed after the latest antenna switch-over or not. In a case where the controlling section 8 determines that T1 second, that is, 1 ms has not elapsed after the latest antenna switch-over, the presently selected antenna continues to be used at step 302, and the program returns to step 301, where the controlling section 8 determines again whether T1 second has elapsed after the latest antenna switch-over or not.

On the other hand, in the case of determining at step 301 that T1 second has elapsed after the latest antenna switch-over, the controlling section 8 compares the multipath noise components outputted from the absolute value circuit 7 (the noise level) with the threshold value Vth outputted from the threshold value setting section 9, thereby determining whether the noise level is higher than the threshold value Vth or not. In the case of determining at step 303 that the noise level is the threshold value Vth or lower, the presently selected antenna continues to be used at step 302, and the program returns to step 301, where the controlling section 8 determines again whether or not T1 second has elapsed after the latest antenna switch-over.

On the other hand, in the case of determining at step 303 that the noise level is higher than the threshold value Vth, the controlling section 8 stores the noise level into a memory (not illustrated) at step 304 and then, outputs an antenna switching instruction to the selection signal outputting circuit 10 to switch the antennas at step 305. Consequently, an antenna selection controlling signal is outputted from the selection signal outputting circuit 10 to the antenna switching circuit 1, whereby the antennas are switched.

Next, at step 306, the controlling section 8 inputs the noise level stored in the memory to the threshold value setting section 9. After that, the program returns to step 301. The threshold value Vth set in the threshold value setting section 9 is set to the stored noise level, so that the detected noise level is afterward compared with the noise level held before antenna switch-over.

As described above, by not allowing antenna switch-over for a fixed time after execution of antenna switching control, it becomes possible to prevent needless antenna switch-over in a case where large multipath noise exists at both of the two antennas at the same time.

Embodiment 4

Furthermore, since the antennas cannot be switched anymore in a case where the noise level held before antenna switch-over has been high and the threshold value has become too large, it is preferred that the threshold value be reset to the initial threshold value when a specified time has elapsed after antenna switch-over. The operation of the controlling section 8 in the case of resetting the threshold value to the initial threshold value when a specified time has elapsed after antenna switch-over will be described below.

In a like manner as described above, since a diversity receiver having the same configuration as that illustrated in FIG. 1 is used, the description thereof will be omitted.

Figure 5:
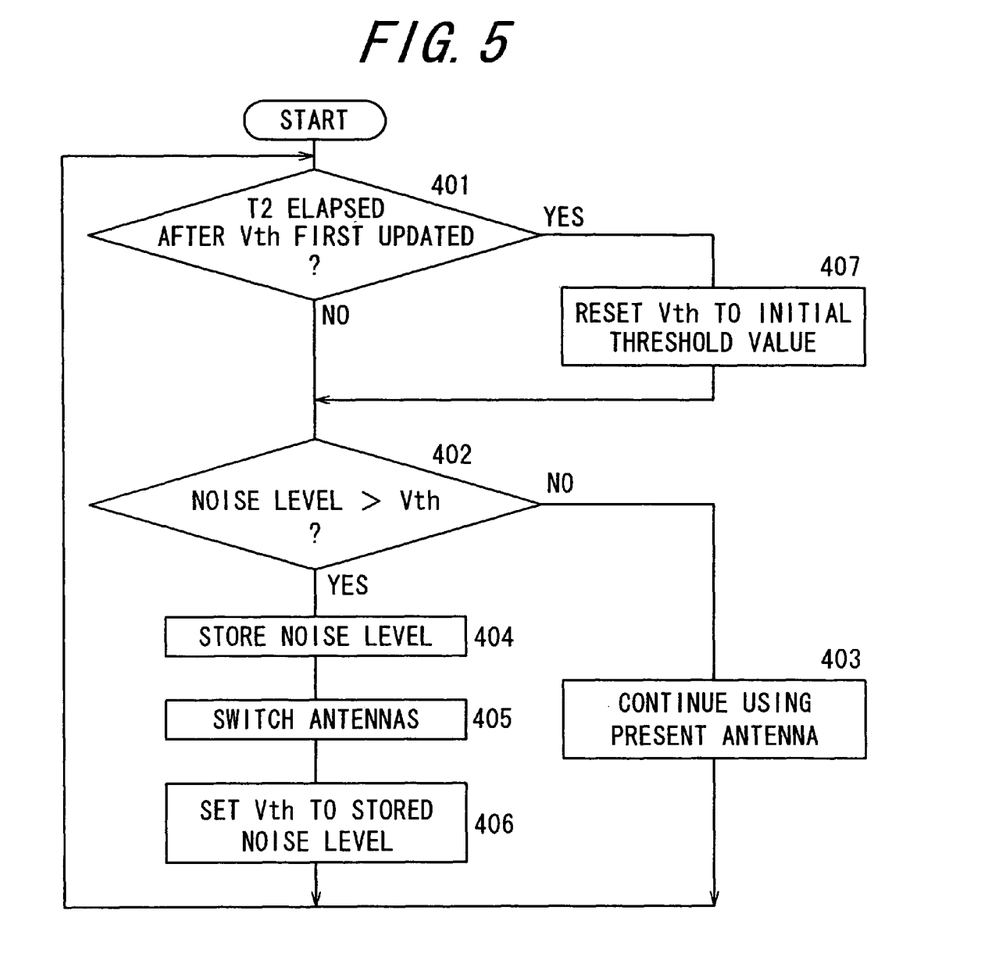
FIG. 5 is a flowchart illustrating the operation in the case of resetting a threshold value to an initial threshold value when a specified time has elapsed after antenna switch-over in which the threshold value has been first changed from the initial threshold value.

FIG. 5 is a flowchart illustrating the operation of the controlling section 8 in the case of resetting the threshold value to the initial threshold value when a specified time has elapsed after antenna switch-over in which the threshold value has been first changed from the initial threshold value.

The controlling section 8 is continuously executing an antenna switching program illustrated in the flowchart of FIG. 5. When starting this program, the controlling section firstly determines whether or not T2 second, for example, 100 ms has elapsed after antenna switch-over in which the threshold value Vth set in the threshold value setting section 9 has been first updated from the initial threshold value. In the case of determining at step 401 that T2 second, that is, 100 ms has not elapsed after the latest antenna switch-over, the controlling section 8 compares at step 402 the multipath noise components (noise level) outputted from the absolute value circuit 7 with the threshold value Vth outputted from the threshold value setting section 9, thereby determining whether the noise level is higher than the threshold value Vth or not.

On the other hand, in the case of determining at step 401 that T2 second has elapsed after the antenna switch-over in which the threshold value Vth set in the threshold value setting section 9 has been first updated from the initial threshold value, the controlling section 8 resets at step 407 the threshold value Vth set in the threshold value setting section 9 to the initial threshold value, and then compares at step 402 the multipath noise components (the noise level) with the threshold value Vth outputted from the threshold value setting section 9.

In the case of determining at step 402 that the noise level is the threshold value Vth or lower, the presently selected antenna continues to be used at step 403, and the program returns to step 401, where the controlling section 8 determines again whether or not T2 second has elapsed after the antenna switch-over in which the threshold value Vth has been first updated from the initial threshold value.

On the other hand, in the case of determining at step 402 that the noise level is higher than the threshold value Vth, the controlling section 8 stores the noise level into a memory (not illustrated) at step 404 and then, outputs an antenna switching instruction to the selection signal outputting circuit 10 to switch the antennas at step 405. Consequently, an antenna selection controlling signal is outputted from the selection signal outputting circuit 10 to the antenna switching circuit 1, whereby the antennas are switched.

Next, at step 406, the controlling section 8 inputs the noise level stored in the memory to the threshold value setting section 9. After that, the program returns to step 401. The threshold value Vth set in the threshold value setting section 9 is set to the stored noise level, so that the detected noise level is afterward compared with the noise level held before antenna switch-over.

Figure 6:
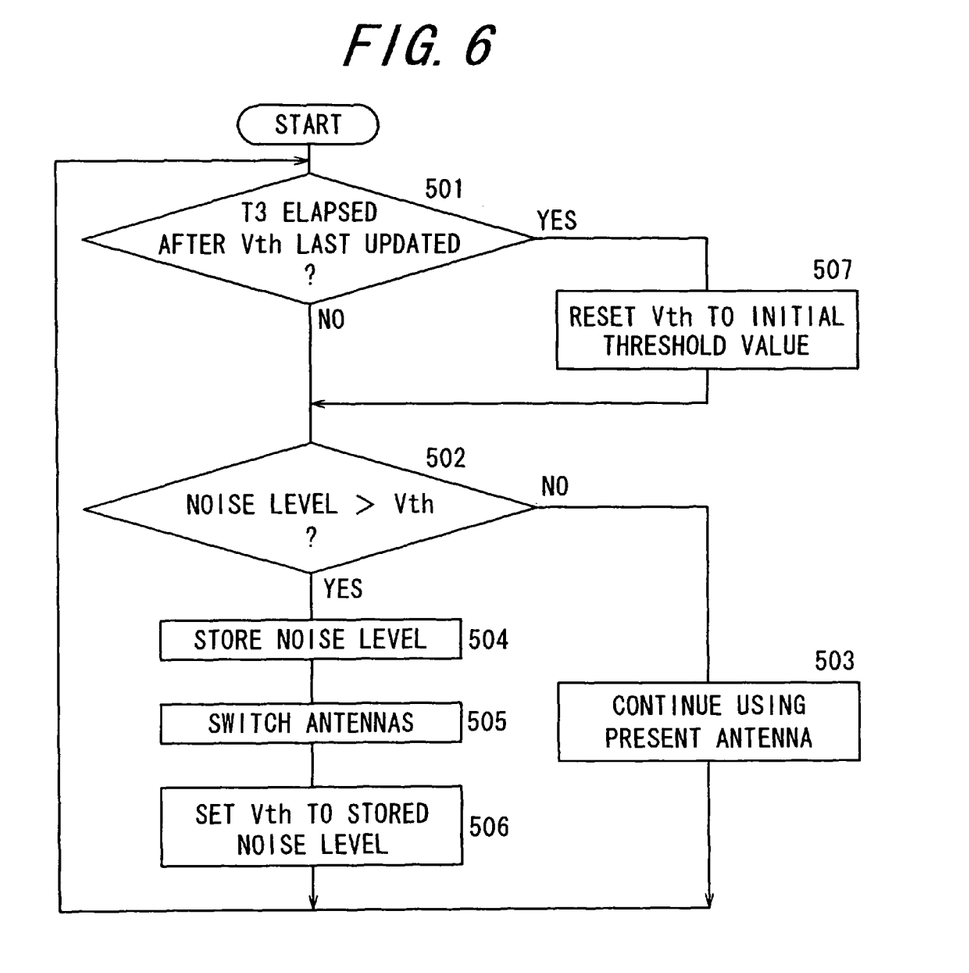
FIG. 6 is a flowchart illustrating the operation in the case of resetting a threshold value to an initial threshold value when a specified time has elapsed after antenna switch-over in which the threshold value has been last updated.

Further, FIG. 6 is a flowchart illustrating the operation of the controlling section 8 in the case of resetting the threshold value to the initial threshold value when a specified time has elapsed after antenna switch-over in which the threshold value has been last updated.

The controlling section 8 is continuously executing an antenna switching program illustrated in the flowchart of FIG. 6. When starting this program, the controlling section 8 firstly determines whether or not T3 second, for example, 20 ms has elapsed after antenna switch-over in which the threshold value Vth set in the threshold value setting section 9 has been last updated. In the case of determining at step 501 that T3 second, that is, 20 ms has not elapsed after the last antenna switch-over, the controlling section 8 compares at step 502 the multipath noise components outputted from the absolute value circuit 7 (the noise level) with the threshold value Vth outputted from the threshold value setting section 9, thereby determining whether the noise level is higher than the threshold value Vth or not.

On the other hand, in the case of determining at step 501 that T3 second has elapsed after the antenna switch-over in which the threshold value Vth set in the threshold value setting section 9 has been last updated, the controlling section 8 resets at step 507 the threshold value Vth set in the threshold value setting section 9 to the initial threshold value, and then compares at step 502 the multipath noise components (the noise level) with the threshold value Vth outputted from the threshold value setting section 9.

In the case of determining at step 502 that the noise level is the threshold value Vth or lower, the presently selected antenna continues to be used at step 503, and the program returns to step 501, where the controlling section 8 determines again whether or not T3 second has elapsed after the antenna switch-over in which the threshold value Vth has been last updated from the initial threshold value.

On the other hand, in the case of determining at step 502 that the noise level is higher than the threshold value Vth, the controlling section 8 stores the noise level into a memory (not illustrated) at step 504 and then, outputs an antenna switching instruction to the selection signal outputting circuit 10 to switch the antennas at step 505. Consequently, an antenna selection controlling signal is outputted from the selection signal outputting circuit 10 to the antenna switching circuit 1, whereby the antennas are switched.

Next, at step 506, the controlling section 8 inputs the noise level stored in the memory to the threshold value setting section 9. After that, the program returns to step 501. The threshold value Vth set in the threshold value setting section 9 is set to the stored noise level, so that the detected noise level is afterward compared with the noise level held before antenna switch-over.

As described above, when T2 second has elapsed after antenna switch-over in which the threshold value has been first changed from the initial threshold value, or when T3 second has elapsed after antenna switch-over in which the threshold value has been last updated, the threshold value is reset to the initial threshold value, so that it becomes possible to avoid such a situation that the antennas cannot be switched anymore, even if the multipath noise level is elevated and a value set as the threshold value increases.

Figure 7:
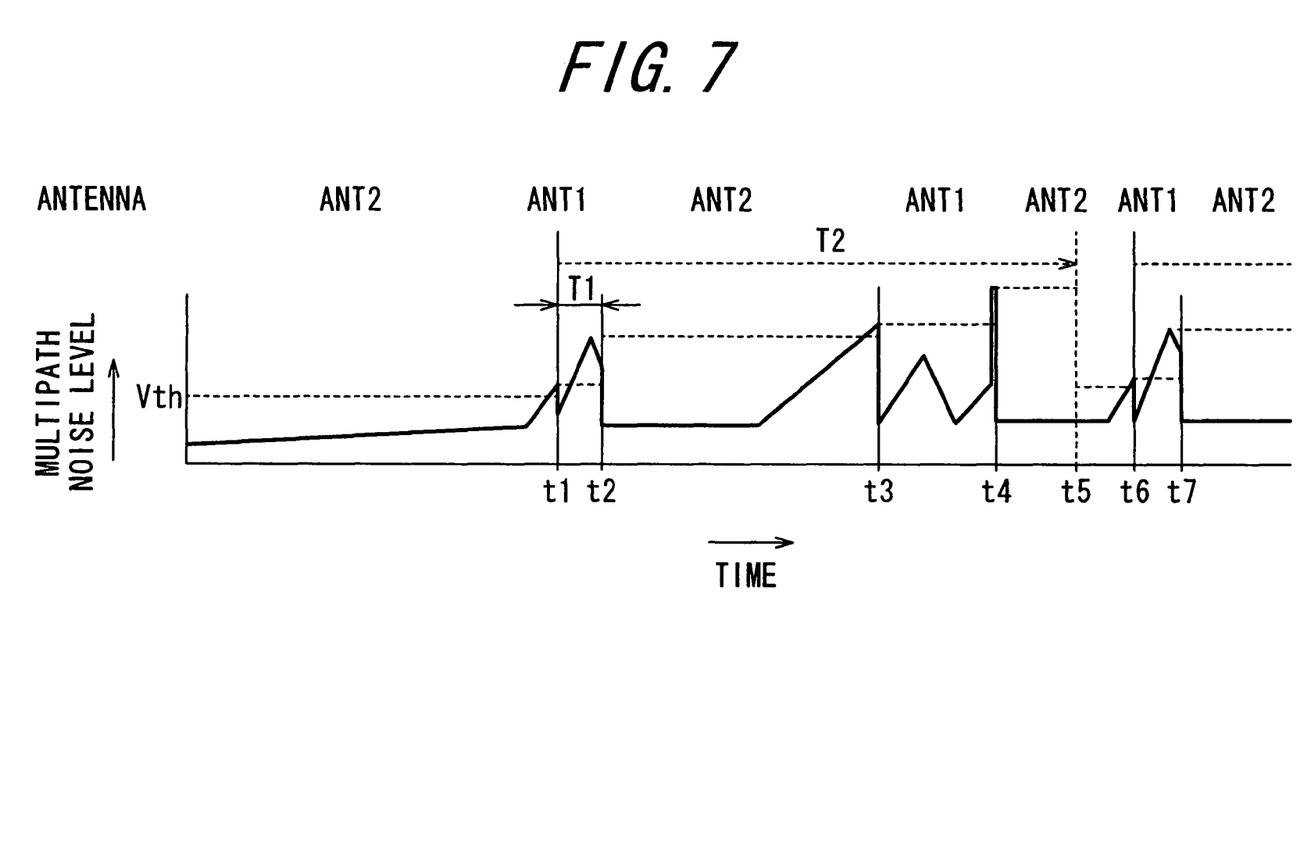
FIG. 7 is a view illustrating a state of antenna switch-over and a state of change of a threshold value.

FIG. 7 is a view illustrating the state of antenna switch-over and the state of change of the threshold value in the case of setting the threshold value to the noise level held before antenna switch-over when the antenna switching control has been executed, and not allowing antenna switch-over for a fixed time T1 after the switch-over, as well as resetting the threshold value to the initial threshold value when a specified time T2 has elapsed after antenna switch-over in which the threshold value has been first changed from the initial threshold value.

As illustrated in FIG. 7, when the multipath noise level represented by a solid line exceeds the initial threshold value of the threshold value Vth represented by a dotted line (a point of time t1), switch-over from the antenna ANT2 to the antenna ANT1 is performed, and the threshold value Vth is updated to the multipath noise level held before the antenna switch-over. And then, until an antenna switching minimum time T1 has elapsed (from the point of time t1 to a point of time t2), antenna switch-over is not performed even if the noise level exceeds the threshold value Vth.

Further, when T2 second has elapsed (a point of time t5) after the first antenna switch-over at the point of time t1, the threshold value Vth is reset to the initial threshold value.

Embodiment 5

Figure 8:
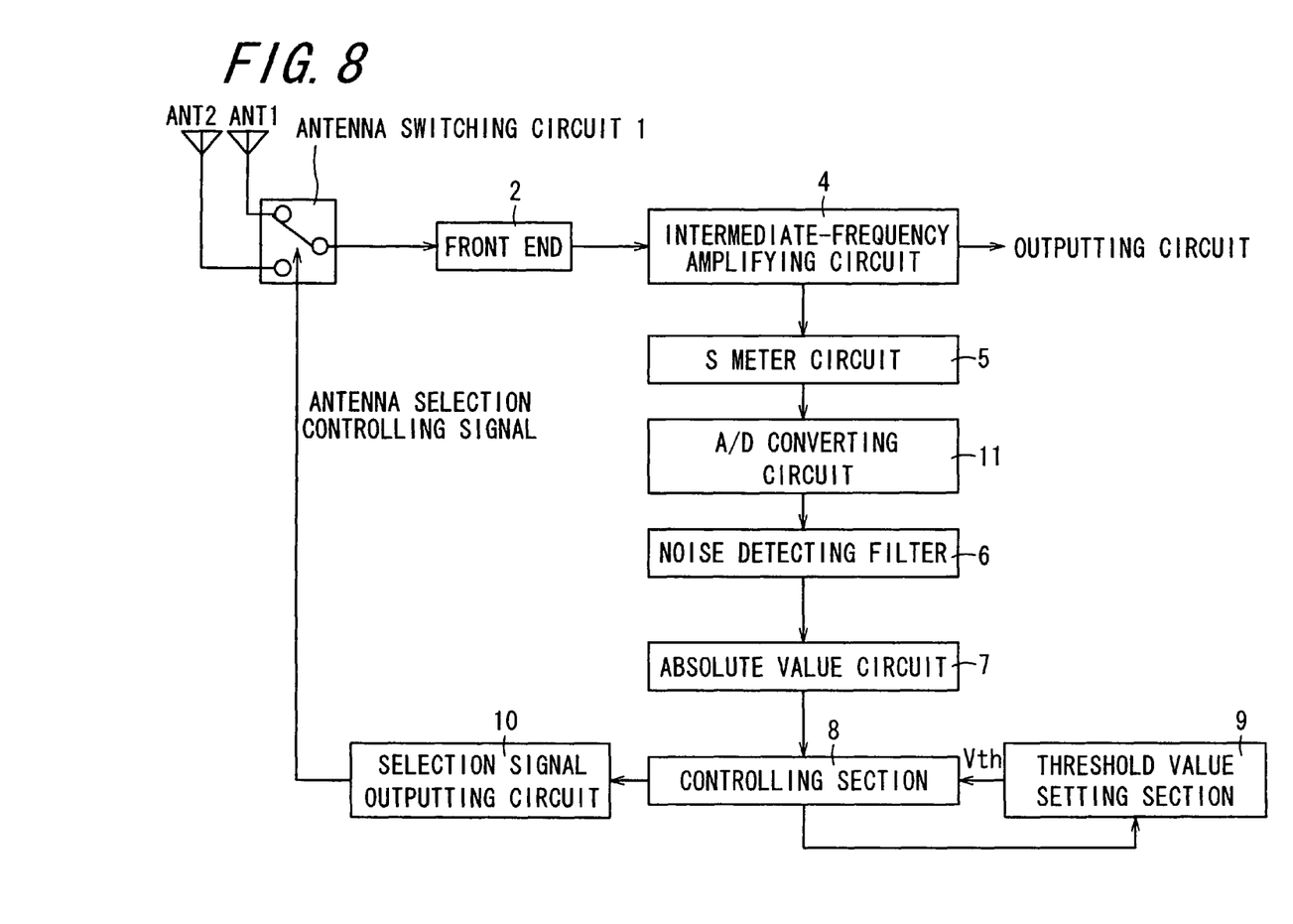
FIG. 8 is a block diagram illustrating the configuration of the diversity receiver which is a receiving apparatus according to another embodiment of the invention.

In the above embodiment, the output of the front end 2 is converted to a digital signal by the A/D converting circuit 3, and signal processing after that is executed by digital circuits, however, as illustrated in FIG. 8, it is also possible to convert the output of the S meter circuit 5 to a digital signal by an A/D converting circuit 11 and use digital processing circuits as circuits for signal processing after that.

Since the operation of a diversity receiver illustrated in FIG. 8 is almost the same as the operation of the diversity receiver illustrated in FIG. 1, the description thereof will be omitted.

Embodiment 6

Further, since noise is caused inevitably at the time of antenna switch-over, and noise canceller means in a latter stage cannot eliminate all the noise, it is preferred that the noise canceller means forcefully eliminate the noise at the time of antenna switch-over. This point will be described below referring to a block diagram of FIG. 9.

Figure 9:
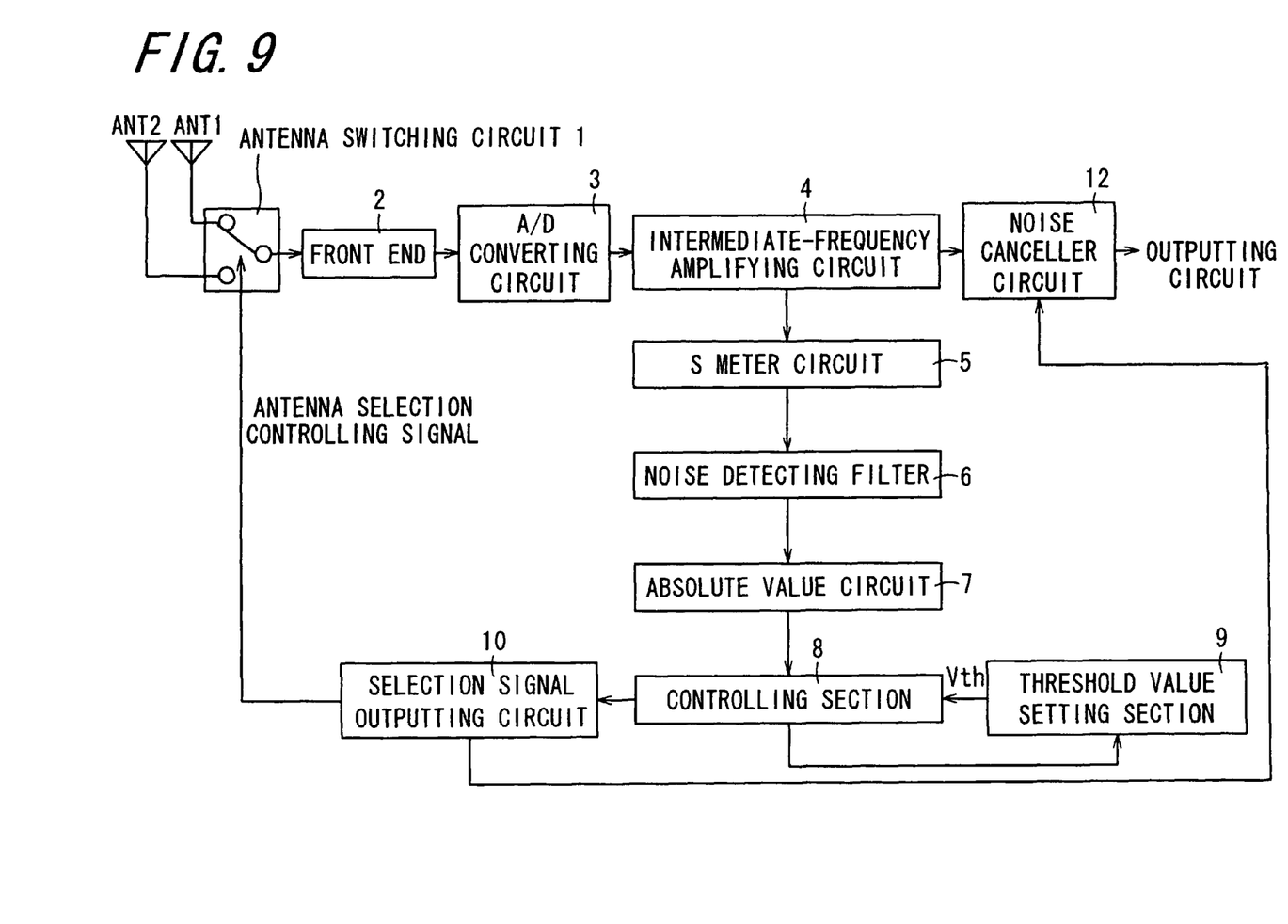
FIG. 9 is a block diagram illustrating the configuration of the diversity receiver which is a receiving apparatus according to still another embodiment of the invention.

In this embodiment, as illustrated in FIG. 9, a noise canceller circuit 12 is disposed in a latter stage of the intermediate-frequency amplifying circuit 4 of the diversity receiver illustrated in FIG. 1, and a noise canceling trigger signal is inputted from the selection signal outputting circuit 10 to the noise canceller circuit 12.

In the diversity receiver illustrated in FIG. 9, the noise canceller circuit 12 executes usual noise canceling in a steady state. When an antenna switching instruction is outputted from the controlling section 8 to the selection signal outputting circuit 10, and the selection signal outputting circuit 10 outputs an antenna selection controlling signal to the antenna switching circuit 1, a noise canceling trigger signal is inputted from the selection signal outputting circuit 10 to the noise canceller circuit 12 simultaneously. Therefore, while the antennas are being switched, the noise canceller circuit 12 forcefully eliminates noise caused by the antenna switch-over, for example, by signal interpolation processing before and after the antenna switch-over.

As described above, by outputting a noise canceling trigger signal to the noise canceller circuit upon switching the antennas, it becomes possible to securely eliminate noise accompanying antenna switch-over.

In the above embodiments, the diversity receiver which is the receiving apparatus according to the embodiment of the invention, is applied to a digital diversity receiver, but it is also possible to apply the diversity receiver of the invention to an analog diversity receiver.

Further, in the above embodiments, the controlling section is configured by a CPU, a ROM, a RAM and so on, and a control function is executed using software, but in the case of an analog diversity receiver, it is possible to execute control by use of an analog threshold value storing circuit, comparing circuit and so on.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:
1. A receiving apparatus comprising:
   a switching circuit configured to perform switch-over between a plurality of antennas;
   a noise detecting filter configured to detect noise included in a signal received from the plurality of antennas; and
   a controlling section configured to control the switching circuit based directly on a comparison between a noise level of the detected noise and a threshold value;
   wherein the controlling section is configured to perform a threshold value setting process to set the threshold value to a value based solely on the noise level, and
   the controlling section is configured to determine, after each execution of the threshold value setting process, an elapsed time since the execution of the threshold value setting process and to stop the comparison between the noise level of the detected noise and the threshold value when the elapsed time is less than a length of time.

2. The receiving apparatus of claim 1, wherein the threshold value is reset in a threshold value resetting process when a time has elapsed after the threshold value setting process.

3. The receiving apparatus of claim 1, wherein the threshold value is set to a larger value than the noise level of the detected noise.

4. The receiving apparatus of claim 1, further including,
a noise canceller circuit configured to eliminate noise generated when controlling the switching circuit based on a trigger signal,
wherein the controlling section outputs the trigger signal when controlling the switching circuit.

5. The receiving apparatus of claim 1, wherein the controlling section is further configured to perform:
a comparison process to compare the value based solely on the noise level with the threshold value when a first time period has elapsed after an antenna switch-over; and
an antenna switch-over process,
wherein the antenna switch-over process and the threshold value setting process are performed when a comparison result obtained in the comparison indicates that the value based solely on the noise level exceeds the threshold value.

6. The receiving apparatus of claim 5, further comprising:
a threshold value resetting process in which the threshold value is reset to an initial threshold value when a second time period has elapsed after an antenna switch-over in which the threshold value has been first changed from the initial threshold value,
wherein the second time period is longer than the first time period.

7. The receiving apparatus of claim 5, further comprising:
a threshold value resetting process in which the threshold value is reset to an initial threshold value when a second time period has elapsed after an antenna switch-over in which the threshold value had been last updated,
wherein the second time period is longer than the first time period.

8. A signal processing circuit comprising:
a noise detecting filter configured to detect noise included in a signal; and
a controlling section configured to output a control signal based directly on a comparison between a noise level of the detected noise and a threshold value,
wherein the controlling section is configured to execute a threshold value setting process for setting the threshold value to a value based solely on the noise level, and
the controlling section is configured to determine, after each execution of the threshold setting process, an elapsed time since the execution of the threshold value setting process and to stop the comparison between the noise level of the detected noise and the threshold value when the elapsed time is less than a length of time.

9. A signal receiving method comprising:
detecting a noise included in a signal; and
outputting a control signal based directly on a comparison between a noise level of the detected noise and a threshold value,
wherein the detecting of the noise included in the signal includes executing a threshold value setting process for setting the threshold value to a value based solely on the noise level, and
after each execution of the threshold value setting process, determining an elapsed time since the execution of the threshold value setting process and stopping the comparison between the noise level of the detected noise and the threshold value when the elapsed time is less than a length of time.

* * * * *